Figure 1:
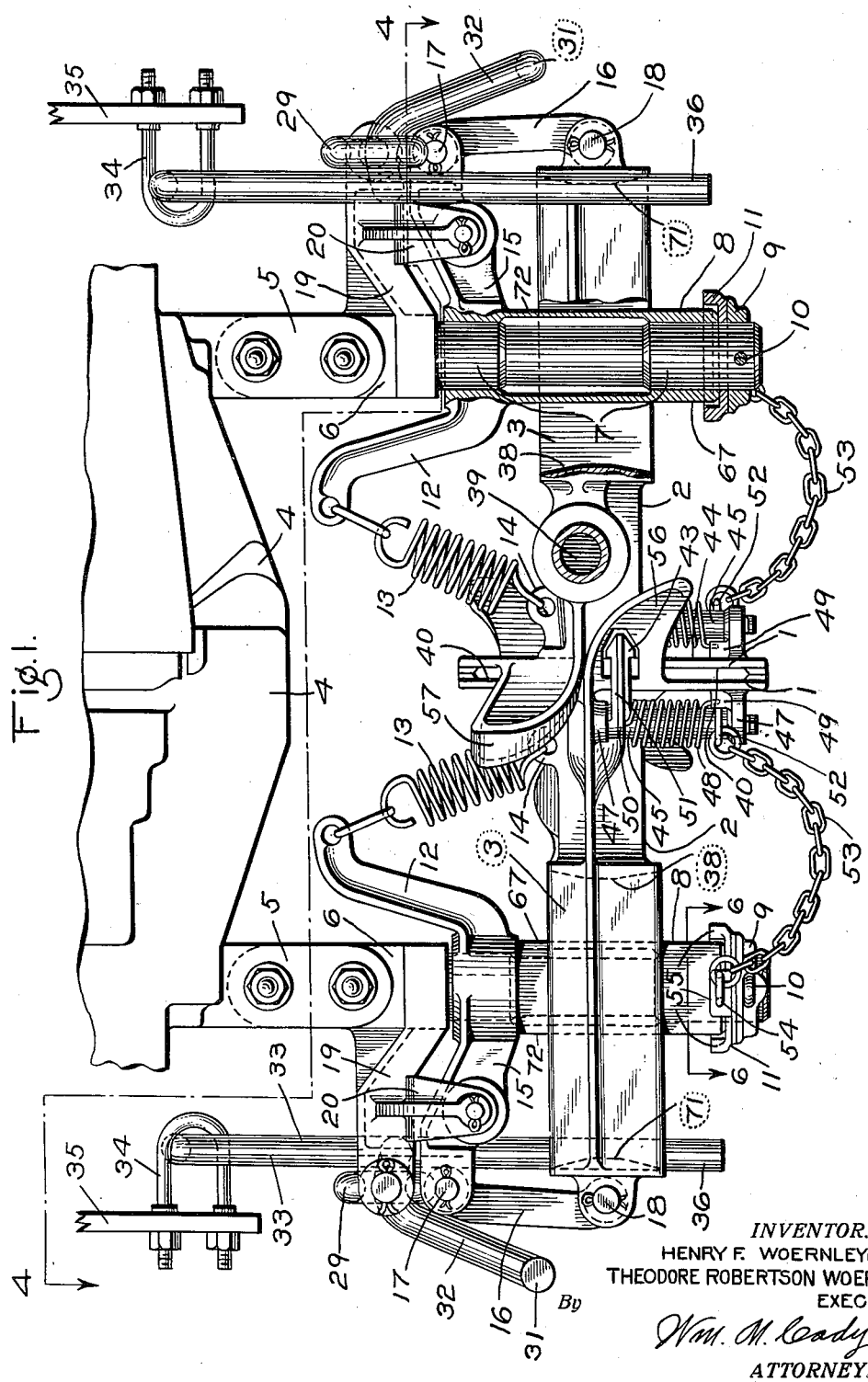

June 11, 1935.  H. F. WOERNLEY  2,004,644
TRAIN PIPE COUPLING
Filed Feb. 18, 1933  4 Sheets-Sheet 1

INVENTOR.
HENRY F. WOERNLEY (DEC'D)
THEODORE ROBERTSON WOERNLEY
EXECUTOR
By Wm. M. Cady
ATTORNEY.

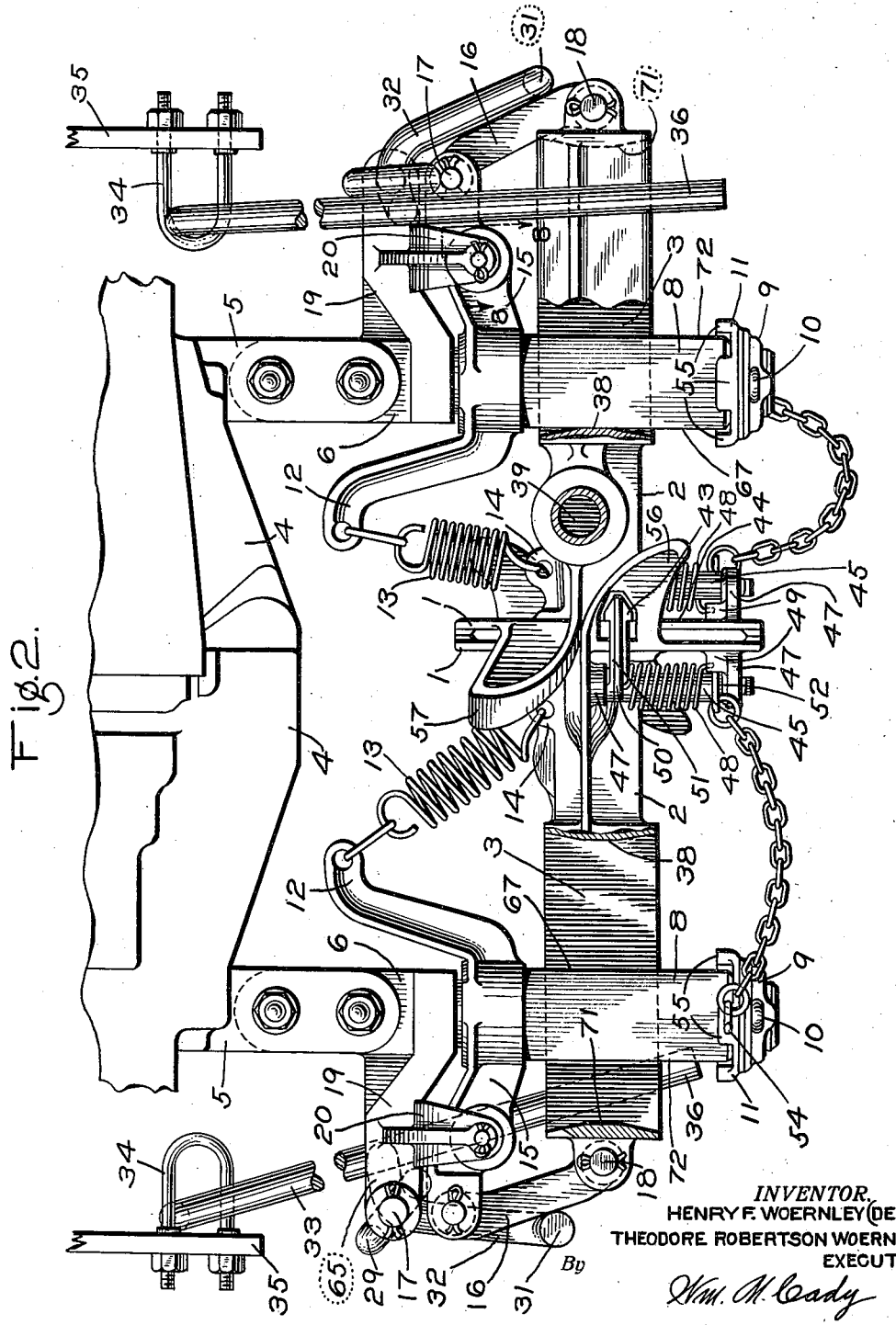

June 11, 1935.  H. F. WOERNLEY  2,004,644
TRAIN PIPE COUPLING
Filed Feb. 18, 1933  4 Sheets-Sheet 3
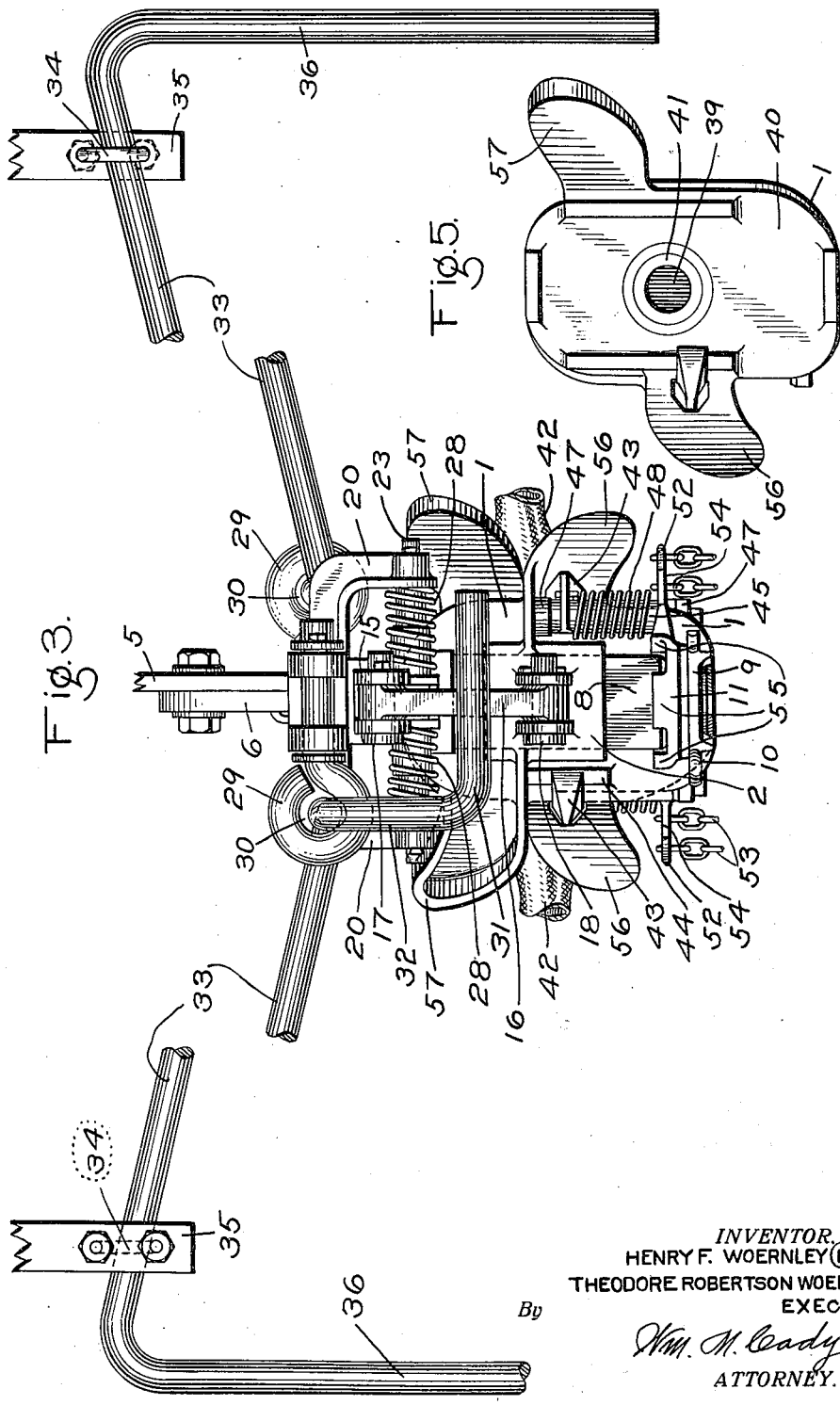
INVENTOR.
HENRY F. WOERNLEY (DEC'D)
THEODORE ROBERTSON WOERNLEY
EXECUTOR
By Wm. N. Cady
ATTORNEY.

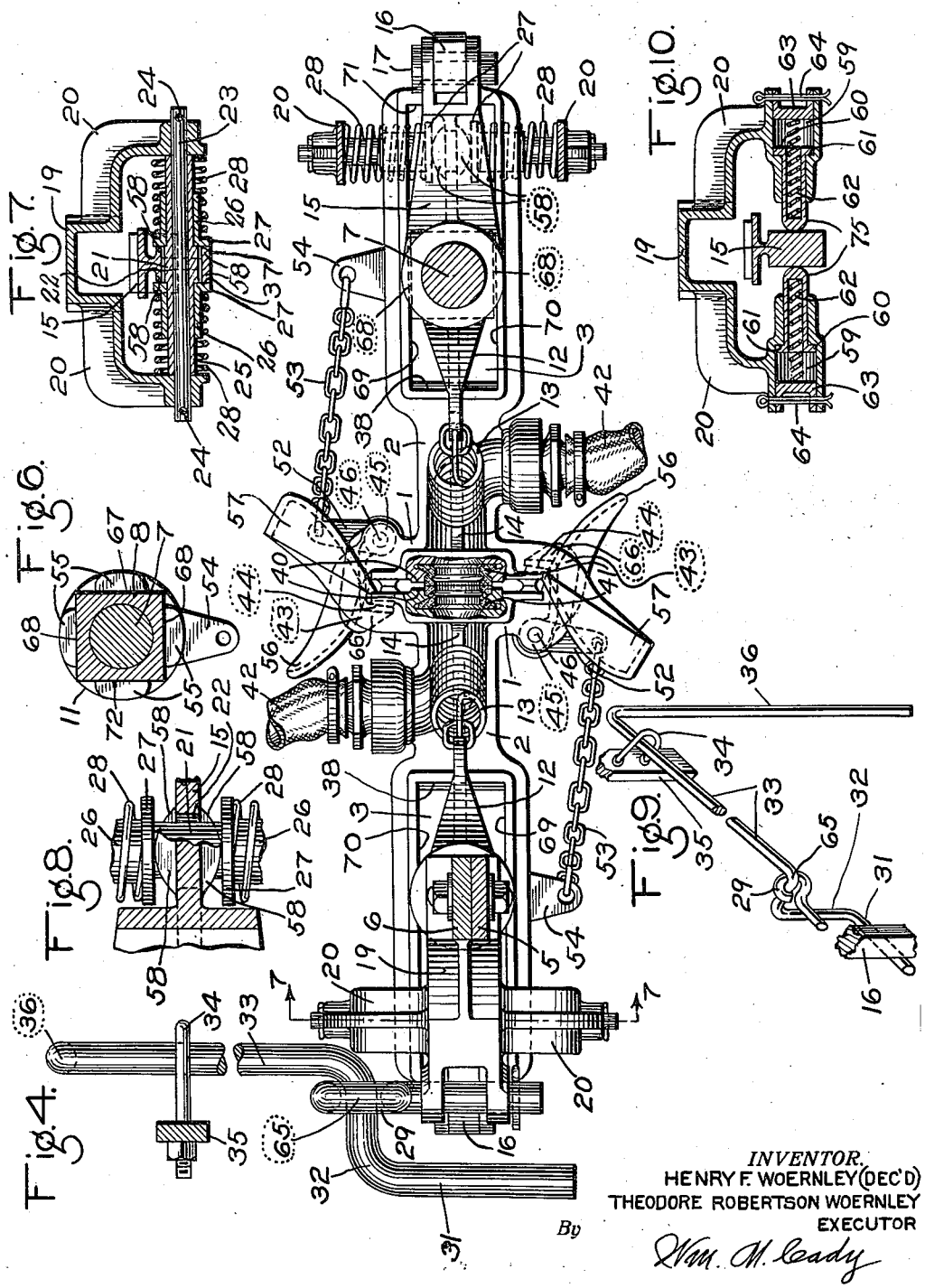

Patented June 11, 1935

2,004,644

UNITED STATES PATENT OFFICE 2,004,644

TRAIN PIPE COUPLING

Henry F. Woernley, deceased, late of Wilkinsburg, Pa., by Theodore Robertson Woernley, executor, Wilkinsburg, Pa., assignor to The Westinghouse Air Brake Company, Wilmerding, Pa., a corporation of Pennsylvania Application February 18, 1933, Serial No. 657,402

21 Claims. (Cl. 285—58)

This invention relates to couplings and more particularly to the type employed between the adjacent ends of cars of a train for establishing communication through a train pipe, such as the brake pipe of a train.

It has heretofore been proposed to provide a train pipe coupling which is suspended beneath the usual car coupler and which is adapted to be manually operated to couple with a counterpart coupling on an adjacent car and which is also adapted to automatically uncouple from the counterpart coupling upon a predetermined movement apart of the two cars, following the uncoupling of the car couplers.

The principal object of my invention is to provide a train pipe coupling of the above type in which certain improvements in construction combine to produce a simple and compact device which is reliable in operation.

Other objects and advantages will appear in the following more detailed description of my invention.

In the accompanying drawings, Fig. 1 is a side elevation of a pair of train pipe couplings embodying my invention and shown in the coupled position and suspended from the usual car couplers; Fig. 2 is a side elevation similar to Fig. 1, showing the relative positions of the coupling heads in the act of coupling; Fig. 3 is an elevational view of a pair of coupled train pipe couplings and of the coupling mechanism as viewed from the rear of one of the couplings; Fig. 4 is a sectional view taken on the line 4—4 of Fig. 1; Fig. 5 is an end view of the train pipe coupling looking toward the coupling face; Fig. 6 is a sectional view taken on the line 6—6 of Fig. 1; Fig. 7 is a sectional view taken on the line 7—7 of Fig. 4, and shows the means for normally maintaining the train pipe coupling head in a centralized position relative to the car coupler; Fig. 8 is an enlarged sectional view taken on the line 8—8 of Fig. 2; Fig. 9 is an isometric view of the operating mechanism for manually coupling two counterpart couplings; and Fig. 10 is a sectional view of a modification of the construction shown in Fig. 7.

As shown in the drawings, the train pipe coupling comprises a coupling head 1 having a rearwardly extending shank 2, which is provided with a vertical longitudinal slot 3, having the side walls 69 and 70 and the front and rear walls 38 and 71, respectively.

The train pipe coupling is disposed beneath the usual car coupler 4. Depending from the car coupler is a lug 5 to which is secured a member 6 having a trunnion 7 extending vertically downwardly. Rotatably carried by said trunnion is a sleeve 8 which, in the present instance, is square in cross section and which has the two side faces 68, as shown in Figs. 4 and 6, spaced apart a distance substantially equal to the distance between the side walls 69 and 70 of the slot, for effecting a driving engagement between said coupling and said sleeve, and which has the two end faces 67 and 72 spaced apart a distance less than the distance between the end walls 38 and 71 of the slot, so as to permit longitudinal movement of the coupling relative to the sleeve.

For supporting the sleeve 8 on the trunnion, a collar 9 is provided, which is secured to the trunnion by any suitable means, such as a cotter pin 10. A member 11, rotatably carried by the trunnion, is interposed between and engages the sleeve 8 and the collar 9, for a purpose which will appear hereinafter.

Carried by the sleeve 8 is an arm 12, which extends forwardly and is centrally disposed with reference to the sleeve. To the arm 12 is connected one end of a tension spring 13, the other end of said spring being connected to a suitable lug 14 on the train pipe coupling head 1, centrally disposed thereof, for yieldingly suspending said head from the arm 12.

An arm 15 carried by the sleeve 8 extends rearwardly and is centrally disposed thereof, the end of said arm being pivoted, by means of a pin 17, to one end of a link 16, the other end of said link being pivotally connected by a pin 18 to the inner end of the shank portion 2 of the train pipe coupling for supporting the inner end of said coupling.

It will be seen from the foregoing description that the train pipe coupling is free to swing longitudinally with respect to the car coupler, due to the fact that the vertically disposed sleeve 8 does not fill the slotted opening 3 longitudinally, and that the coupling is adapted to rotate in a horizontal plane, because the sleeve 8, which carries the coupling, is rotatably mounted on the vertically disposed trunnion 7. Since the spring 13 and the link 16 for supporting the coupling, are supported from the arms 12 and 15, respectively, which are carried by the sleeve 8 and are disposed in alignment with the longitudinal axis of the coupling, and since the sleeve and the coupling are adapted to rotate together, it will be seen that said spring and said link are maintained in vertical alignment with the longitudinal axis of the coupling, regardless of the rotational position of the coupling. It will still further be noted that the coupling, being supported at the front end by the spring 13 and at the rear end by the pivoted link 16, is adapted to move vertically.

Means are also provided for normally maintaining the coupling centralized relative to the coupler, which means will now be described.

Projecting rearwardly from the member 6 and disposed above the arm 15 is an arm 19 provided with two oppositely disposed arms 20, which extend laterally of said arm 15, the end of one arm 20 being disposed at one side of the arm 15 and the end of the other arm 20 being disposed at the opposite side of the arm 15.

The arm 15 is provided with an opening 22 and, according to the construction, is also provided, on each transverse side thereof, with a pair of lugs 58, one lug of each pair being disposed directly above and the other lug of each pair being disposed directly below said opening. The lugs are preferably the same in dimensions and have arcuate outer faces so arranged that the faces on either side of the arm 15 are in vertical alignment.

Removably carried by the aforementioned ends of the arms 20 and extending through the opening 22 in the arm 15 is a pin 23, said pin being maintained in position against longitudinal displacement by the cotter pins 24. Loosely carried by said rod is a sleeve 25, which may be a neat fit between the ends of the arms 20 and which, according to the construction, may have an enlarged central section 21 which is substantially equal in length to the distance between the outer faces of oppositely disposed lugs 58, the ends of said enlarged section forming the annular shoulders 37. Slidably mounted on the sleeve 25 are the sleeves 26, having the flanges 27. For urging the sleeves 26 into engagement with the adjacent lugs 58 and with the adjacent shoulders 37, springs 28 are provided, which are initially under compression between the flanges 27 and the ends of the arms 20. Thus, the springs 28 being opposed to each other, tend to normally maintain the arm 15, and therefore the sleeve 8 and the coupling head 1, in a centralized position with respect to the car coupler. It should be understood that as the coupling head is rotated in one direction or the other from the centralized position, as when two misaligned couplings are in the act of being coupled, which will be described hereinafter, the lugs 58 on one side or the other of the arm 15 will act on the adjacent flange 27 to compress the corresponding spring 28. The faces of the lugs which engage the flanges are arcuate in shape, so that the engagement of each lug with the flange will be substantially a line which lies in a plane with the axis of the flange and with the line of contact between the other lug on the same side of the arm 15 and the corresponding flange throughout the range of rotation of the arm, thereby avoiding binding of the sleeve 26 on the sleeve 25, with consequent undue resistance to motion and excessive wear of the sleeves.

For manually coupling the coupling heads 1, a coupling mechanism is provided which comprises a rod having an arm 31 which is adapted to engage the rear face of the link 16. At one end of the arm 31, the rod normally extends upwardly and forwardly, forming an arm 32 which is bent sharply forward at its upper end to form an arm 65 which loosely engages a member 29 within an eye formed in said member, said member being rotatably carried by the arm 19 of the member 6. The arm 65 terminates in an arm 33 which extends toward the side of the car, said arm being supported by any suitable means, such as a U-bolt 34, which may be mounted on a plate 35 secured to the end of the car. At the outer end of the arm 33, beyond the U-bolt, the rod is bent downwardly to form an operating lever 36, by means of which a trainman may manually couple the counterpart coupling heads 1 from the side of the car, as will be described hereinafter.

It will be noted that the forward wall 38 of the slot 3 in the coupling shank 2 is adapted to engage the forward face 67 of the sleeve 8, so as to limit the rearward movement of the train pipe coupling head 1 to the uncoupled position, in which position the right hand coupling head is shown in Fig. 2. In the uncoupled position, support spring 13 is inclined at an angle to the vertical, so as to tend to maintain the coupling head in a position at the rear of the coupling plane, when not coupled to a counterpart coupling head.

The coupling head 1 is provided with one or more through passages, such as the passage 39, each of which terminates in the coupling face 40, and a gasket 41 is provided where each passage terminates, for effecting a leak-proof seal between the passage of one coupling and the corresponding passage in a counterpart coupling when the couplings are coupled. The conduit 39 is adapted to be connected by means of flexible hose connections 42 to a train pipe (not shown), such as the usual brake pipe.

The train pipe coupling head 1 is manually moved into the coupling position, shown in Fig. 2, against a counterpart coupling head by means of the operating lever 36, in a manner described hereinafter. In the coupled position of two coupling heads, as shown in Fig. 1, the gaskets 41 in the coupling face of each of said heads engage and are compressed to effect leak-proof seals, and when so compressed, locking means operate automatically to hold the coupling heads in the coupled position, so that the trainman may permit lever 36 to return to its normally coupled or vertical position.

Each coupling head is provided with a latch 43, which is pivotally carried at one side of the longitudinal axis thereof, and with a flange or shoulder 44 at the opposite side of said axis, the latch of one coupling being adapted, in the act of coupling, to ride over and lock onto the shoulder of the counterpart coupling for locking said couplings in the coupled position. The latch 43 is in the form of an arm secured to a sleeve 45. The sleeve 45 is rotatably mounted on a pin 46 which is carried by two spaced lugs 47 projecting from the side of the coupling head. Surrounding the sleeve 45 is a torsion spring 48 at all times under strain, one end of which spring is secured to a lug 49 on the side of the coupling head, while the other end is secured to a lever arm 50 projecting from the body 51 of the latch 43, so that said spring at all times urges the latch 43 in such a direction as to effect automatic engagement of said latch with the flange 44 of the counterpart coupling in coupling, as will be more fully described hereinafter.

For pulling the latch 43 out of locking engagement with the flange 44 of the counterpart coupling when it is desired to effect an uncoupling, a lever 52, carried by the sleeve 45, is connected by means such as a chain 53 to an arm 54 carried by the member 11 interposed between the sleeve 8 and the collar 9. When two cars move apart after uncoupling of the car coupler has been effected, the chain is pulled taut, so as to rotate the sleeve 45 and thereby release the coupling latch 43 from engagement with the flange 44, which will permit automatic uncoupling of the train pipe couplings.

The member 11 is mounted on the trunnion 7 between the collar 9 and the lower end of the sleeve 8 and is provided with spaced lugs 55 adapted to engage the four faces on the sleeve 8, as shown in Fig. 6, so that the member 11, and therefore the arm 54, rotates with the sleeve 8 relative to the trunnion 7. Therefore, since the arm 54 rotates with the sleeve 8 and since, as hereinbefore described, the coupling head rotates with the sleeve, there will be no rotative movement of the coupling head relative to the arm 54, which would otherwise tend to cause the stretching of the chain and the consequent release of the latch 43. Since rotative movement of the coupling head does not operate to release the latch, the latch will not be released when attempting to couple two horizontally misaligned counterpart couplings or when the coupled heads are rotated horizontally in rounding a curve.

It will be evident, that should the spring 13 break, the collar 9, acting through the medium of the member 11, will support the train pipe coupling head.

For centering, or bringing two counterpart coupling heads 1 into alignment with each other in coupling, the coupling head is provided with two oppositely disposed forwardly projecting horns 56 and 57. These horns flare outwardly in such a manner as to guide two counterpart coupling heads into proper coupling relation in the act of coupling.

It will be noted from Fig. 4 that the horn 57 is thickened at its end instead of tapering to a point, as does the horn 56. Under certain conditions of misalignment, the end of the horn 57, if it were pointed, might become wedged in the space between the latching face of the latch 43 and the face 40 of the counterpart coupling when two couplings are brought together for the purpose of coupling, and thereby prevent the coupling from being effected. The end of the horn 57 being thickened, will not become wedged between the latch and the coupling face of the counterpart coupling when two misaligned coupling heads are brought together.

Means other than those shown in Figs. 7 may be employed for normally maintaining the sleeve 8 and, therefore, the train pipe coupling, in alignment with the longitudinal axis of the car coupler. According to the construction shown in Fig. 10, means may be provided which comprise a plunger 75 slidably carried in a bore 59 at each end of the arms 20, the ends of said plungers being adapted to engage the respective side faces of the arm 15. Each plunger is provided with a flange 60 which is adapted to engage a shoulder 61 in the bore 59 for defining the normal position of said plunger, in which position the plunger substantially engages the arm 15, said plunger being urged to engage said shoulder and said arm by a coil spring 62 which is under initial compression between the plunger and a spring retainer 63, which is removably secured to the arm 20 by any suitable means, such as a cotter pin 64.

In operation, when two cars are being coupled together, the car couplers are first coupled in the usual manner, by the impact of two cars coming together. At this time, the train pipe couplings will be separated, due to the fact that when the train pipe couplings are uncoupled, springs 13 hold said couplings in a position to the rear of the coupling plane of the car couplers, in which position the front wall 38 of the slot 3 engages the front face 67 of the sleeve 8.

After the car couplers are interlocked, the trainman, at the side of the car, operates the handle 36 to couple the train pipe couplings. Assuming that the handle 36 of the coupling mechanism at the left of Fig. 2 is operated, the corresponding arm 31 is swung to the right so as to engage the link 16, and thereby the left hand coupling head is shifted across the coupling plane of the car couplers into engagement with the counterpart coupling head at the right, as shown in Fig. 2. As the left hand coupling head approaches the other, the horns 56 engage the horns 57, respectively, and guide the two heads into the proper coupling relation, in the well known manner.

When the coupling head at the left is brought into engagement with the coupling head at the right, the counterpart conduit gasket rings 41 in the coupling face of the coupling heads engage and are compressed to effect a leak-proof seal, and at substantially the same time the tapered nose 66 of latch 43 slides over the flange 44 of the counterpart coupling head and permits the force of the torsional spring 48 to snap said latch into locking engagement with the flange 44 of the counterpart coupling head.

After the coupling head at the left is locked in engagement with the coupling head at the right, the trainman releases the handle 36, which then returns to its vertical position, due to gravity. The spring 13 of the left hand coupling head, having been tensioned by the movement of the head to engage the coupling head at the right, then exerts a pull on the coupling heads to move same to the position shown in Fig. 1, in which the coupling plane of the train pipe couplings coincides with the coupling plane of the car couplers. The springs 13 of the opposing coupling heads will then act to yieldingly maintain the heads in this position.

Since the coupling is adapted to move longitudinally relative to the sleeve 8 and is also adapted to move laterally on account of being pivotally carried by the trunnion 7, it will be evident that the coupling heads, when coupled, are free to swing laterally as a unit and to move longitudinally as a unit, to allow for changes in position due to rounding curves and the like.

The train pipe couplings may be uncoupled either automatically or manually. If it is desired to effect automatic uncoupling, the car couplers 4 are first uncoupled in the usual manner, after which the movement of the cars, as they separate, relative to the train pipe couplings, moves the trunnion 7 with the sleeve 8, and consequently the arm 54, to which one end of the chain 53 is fastened, rearwardly away from the train pipe coupling head 1. As the cars continue to move apart, the rearward movement of the sleeve 8 relative to the coupling head within the slot 3, and the consequent movement of the arm 54, will cause the chain to be pulled taut with sufficient force to release the latch 43 from the flange 44 on the counterpart coupling head, after which the spring 13 pulls the coupling head rearwardly to the uncoupled position, in which the wall 38 of the slot 3 in the coupling shank 2 engages the front face 67 of the sleeve 8.

In the uncoupling operation just described, it will be evident that the latch 43 on both of the coupling heads will be operated and released at substantially the same time.

If it is desired to manually uncouple the train pipe couplings, the trainman simultaneously pulls out both of the chains 53 of the coupling heads, so as to effect a release of the latch 43 of both coupling heads simultaneously.

It will now be evident that I have provided a train pipe coupling mechanism which embodies improved features of construction which combine to produce a device that is simple and compact.

While one illustrative embodiment of the invention has been described in detail, it is not the intention to limit its scope to that embodiment or otherwise than by the terms of the appended claims.

Having now described the invention, what is claimed as new and desired to be secured by Letters Patent, is:

1. The combination with a train pipe coupling unit, of a trunnion adapted to be secured to a car coupler in fixed relation thereto and in vertical position, a sleeve rotatably mounted on said trunnion, supporting means carried by said sleeve for supporting the forward end of said unit, and supporting means carried by said sleeve for supporting the rear end of said unit.

2. The combination with a train pipe coupling unit, of a trunnion adapted to be secured to a car coupler in fixed relation thereto and in vertical position, a sleeve rotatably mounted on said trunnion and extending through an opening in said unit, means carried by said sleeve for supporting said unit, means for causing said sleeve and said coupling unit to always rotate together relative to said trunnion, an arm on said sleeve, a pair of arms fixed with respect to said trunnion, and spring means carried by said fixed arms and acting on said first mentioned arm for yieldingly opposing rotative movement of said sleeve and thereby said unit relative to said trunnion.

3. The combination with a train pipe coupling unit, of a trunnion adapted to be secured to a car coupler in fixed relation thereto and in vertical position, a sleeve rotatably mounted on said trunnion and extending through an opening in said unit, means for causing said sleeve and said coupling unit to always rotate together relative to said trunnion, a forwardly extending arm on said sleeve, supporting means carried by said forwardly extending arm for supporting the forward end of said unit, a rearwardly extending arm on said sleeve, supporting means carried by said rearwardly extending arm for supporting the rear end of said unit, and means acting on one of said arms for yieldingly opposing rotative movement of said sleeve and thereby said unit relative to said trunnion.

4. The combination with a train pipe coupling unit, of a trunnion adapted to be secured to a car coupler in fixed relation thereto and in vertical position, a sleeve rotatably mounted on said trunnion and extending through an opening in said unit, means for causing said sleeve and said coupling unit to always rotate together relative to said trunnion, a forwardly extending arm on said sleeve, supporting means carried by said forwardly extending arm for supporting the forward end of said unit, a rearwardly extending arm on said sleeve, supporting means carried by said rearwardly extending arm for supporting the rear end of said unit, a pair of arms fixed with respect to said trunnion and disposed at transversely opposite sides of one of said other arms, and spring means carried by said fixed arms and acting on said last mentioned arm for yieldingly opposing rotative movement of said sleeve and thereby said unit relative to said trunnion.

5. The combination with a train pipe coupling unit, of a trunnion adapted to be secured to a car coupler in fixed relation thereto and in vertical position, a sleeve rotatably mounted on said trunnion and extending through an opening in said unit, means carried by said sleeve for supporting said unit, means for causing said sleeve and said coupling unit to always rotate together relative to said trunnion, an arm on said sleeve, a pair of arms fixed with respect to said trunnion and disposed at transversely opposite sides of said arm, and spring means carried by said fixed arms and acting on said arm for yieldingly opposing rotative movement of said sleeve and thereby said unit relative to said trunnion.

6. The combination with a train pipe coupling unit, of a trunnion adapted to be secured to a car coupler in fixed relation thereto and in vertical position, a sleeve rotatably mounted on said trunnion and extending through an opening in said unit, means carried by said sleeve for supporting said unit, means for causing said sleeve and said coupling unit to always rotate together relative to said trunnion, an arm on said sleeve, a pair of arms fixed with respect to said trunnion and disposed at transversely opposite sides of said arm, a member carried by said fixed arms, a member slidably mounted on said member and disposed at one transverse side of and adapted to engage said arm, another member slidably mounted on said first mentioned member and disposed at the opposite transverse side of and adapted to engage said arm, and a spring for urging each slidably mounted member into engagement with said arm for yieldingly opposing rotative movement of said sleeve and thereby said unit relative to said trunnion.

7. The combination with a train pipe coupling unit, of a trunnion adapted to be secured to a car coupler in fixed relation thereto and in vertical position, a sleeve rotatably mounted on said trunnion and extending through an opening in said unit, means carried by said sleeve for supporting said unit, means for causing said sleeve and said coupling unit to always rotate together relative to said trunnion, an arm on said sleeve, a pair of arms fixed with respect to said trunnion and disposed at transversely opposite sides of said arm, a member carried by said fixed arms and having a pair of spaced shoulders formed thereon, a member slidably mounted on said member and disposed at one transverse side of said arm and adapted to engage said arm and one of said shoulders, another member slidably mounted on the first mentioned member and disposed at the opposite transverse side of said arm and adapted to engage said arm and the other of said shoulders, and a spring for urging each slidably mounted member into engagement with one of said shoulders and with said arm for yieldingly opposing rotative movement of said sleeve and thereby said unit relative to said trunnion.

8. The combination with a train pipe coupling unit, of a trunnion adapted to be secured to a car coupler in fixed relation thereto and in vertical position, a sleeve rotatably mounted on said trunnion and extending through an opening in said unit, means carried by said sleeve and said coupling unit for supporting said unit, means for causing said sleeve to always rotate together relative to said trunnion, an arm on said sleeve and having an aperture formed therein, a pair of arms fixed with respect to said trunnion and disposed at transversely opposite sides of said arm, a rod carried by said fixed arms and extending through said aperture, a sleeve mounted on said rod and having two spaced shoulders formed thereon, a member slidably mounted on said sleeve and disposed at one transverse side of said arm and adapted to engage said arm at said side and adjacent to said aperture and also adapted to engage one of said shoulders, another member slidably mounted on said sleeve and disposed at the opposite transverse side of said arm and adapted to engage said arm at said side and adjacent to said aperture and also adapted to engage the other of said shoulders, and a spring for urging each said slidably mounted member into engagement with said arm and with one said shoulder for yieldingly opposing rotative movement of said sleeve and thereby said unit relative to said trunnion.

9. The combination with a train pipe coupling unit, of a trunnion adapted to be secured to a car coupler in fixed relation thereto and in vertical position, a sleeve rotatably mounted on said trunnion and extending through an opening in said unit, means carried by said sleeve for supporting said unit, means for causing said sleeve to rotate with said unit relative to said trunnion, an arm on said sleeve, a pair of arms fixed with respect to said trunnion and disposed at transversely opposite sides of said arm, said fixed arms being provided with a bore, a plunger slidably mounted in each said bore and adapted to engage said arm, means secured to the end of said bore, and a spring interposed between and engaging said plunger and said last mentioned means for urging said plunger into engagement with said arm.

10. The combination with a train pipe coupling unit, of a trunnion adapted to be secured to a car coupler in fixed relation thereto and in vertical position, a sleeve rotatably mounted on said trunnion and extending through an opening in said unit, means carried by said sleeve for supporting said unit, means for causing said sleeve to rotate with said unit relative to said trunnion, an arm on said sleeve, a pair of arms fixed with respect to said trunnion and disposed at transversely opposite sides of said arm, said fixed arms being provided with a bore, a shoulder in said bore, a plunger slidably mounted in each said bore and adapted to engage said arm, means associated with said plunger for engaging said shoulder, means secured to the end of the bore, and a spring interposed between and engaging said plunger and said last mentioned means for urging said plunger into engagement with said arm and for urging said last mentioned means into engagement with said shoulder.

11. The combination with a train pipe coupling unit having an uncoupled position, of a trunnion adapted to be secured to a car coupler in fixed relation thereto and in vertical position, a sleeve rotatably carried by said trunnion, a spring carried by said sleeve and connected to said coupling for supporting said coupling and for moving said coupling to the uncoupled position, and coacting means associated with said sleeve and said unit for defining said position.

12. The combination with a train pipe coupling unit having a slot, said unit having an uncoupled position, of a trunnion adapted to be secured to a car coupler in fixed relation thereto and in vertical position, a sleeve rotatably mounted on said trunnion and extending through said slot, said sleeve being adapted to permit longitudinal movement of said unit relative to said sleeve, a spring for supporting the forward end of said unit and for moving said unit to said uncoupled position, means for supporting the rear end of said unit and cooperating with said spring for permitting longitudinal movement of said unit relative to said sleeve, and means on said unit coacting with said sleeve for defining said uncoupled position.

13. The combination with a train pipe coupling unit, of a trunnion adapted to be secured to a car coupler in fixed relation thereto and in vertical position, a sleeve rotatably mounted on said trunnion, supporting means carried by said sleeve for supporting said unit, said unit being movable longitudinally of said sleeve to a coupling position, an arm fixed with respect to the trunnion, and means carried by the car and by said arm and operative manually from the side of the car for projecting said coupling into said coupling position.

14. The combination with a train pipe coupling unit, of a trunnion adapted to be secured to a car coupler in fixed relation thereto and in vertical position, a sleeve rotatably mounted on said trunnion, supporting means carried by said sleeve for supporting said unit, said unit being movable longitudinally of said sleeve to a coupling position, an arm fixed with respect to the trunnion, a rotatable member carried by said arm and having an opening formed therethrough, and means carried by the car and threaded through said opening and manually operative from the side of the car for projecting said coupling into said coupling position.

15. The combination with a train pipe coupling unit having a coupling position, of a trunnion adapted to be secured to a car coupler in fixed relation thereto and in vertical position, a sleeve rotatably mounted on said trunnion, a spring carried by said sleeve and connected to the forward end of said unit for supporting said forward end, a link pivotally carried by said sleeve and pivotally connected to the rear end of said unit for supporting said rear end, an arm fixed with respect to said trunnion, and means carried by the car and by said arm and operative manually from the side of the car for engaging said link for projecting said coupling into said coupling position.

16. The combination with a train pipe coupling unit, of a trunnion adapted to be secured to a car coupler in fixed relation thereto and in vertical position, a sleeve rotatably mounted on said trunnion, supporting means carried by said sleeve for normally supporting said unit, and means carried by said trunnion for supporting said sleeve on said trunnion, said means also acting as a support for said unit upon failure of said normal supporting means for said unit.

17. The combination with a trunnion adapted to be secured to a car coupler in fixed relation thereto and in vertical position, of a train pipe coupling, a sleeve rotatably mounted on said trunnion and extending through an opening in said coupling and slidable therein in a vertical direction to permit vertical movement of said coupling relative to said sleeve, means on said sleeve cooperating with said unit within said opening for causing said sleeve to rotate with said unit relative to said trunnion and permitting longitudinal movement of said unit relative to said sleeve, and means carried by said sleeve for supporting said unit.

18. The combination with a train pipe coupling unit, of a trunnion adapted to be secured to a car coupler in fixed relation thereto and in vertical position, a sleeve rotatably mounted on said trunnion, supporting means carried by said sleeve for supporting said unit, said unit being movable longitudinally of said sleeve to a coupling position, a spring carried by said sleeve and connected to the forward end of said unit for supporting said forward end, a member pivotally carried by said sleeve and pivotally connected to the rear end of said unit for supporting said rear end, and means adapted to engage said member for projecting said unit into said coupling position.

19. The combination with a train pipe coupling unit, of a trunnion adapted to be secured to a car coupler in fixed relation thereto and in vertical position, a sleeve rotatably mounted on said trunnion, supporting means carried by said sleeve for supporting said unit, said unit being movable longitudinally of said sleeve to a coupling position, a spring carried by said sleeve and connected to the forward end of said unit for supporting said forward end, a link pivotally carried by said sleeve and pivotally connected to the rear end of said unit for supporting said rear end, and means adapted to engage said link for projecting said unit into said coupling position.

20. The combination with a train pipe coupling unit, of a trunnion adapted to be secured to a car coupler in fixed relation thereto and in vertical position, said trunnion having a free end extending through and beyond an opening in said unit, supporting means rotatably carried by said trunnion for normally supporting said unit, and means mounted on said trunnion at said free end for supporting said unit upon failure of said normal supporting means to support said unit.

21. The combination with a trunnion adapted to be secured to a car coupler in fixed relation thereto and in vertical position, of a train pipe coupling unit, means mounted on said trunnion for carrying said unit and permitting longitudinal movement of said unit relative to said trunnion to a coupling position, said means comprising link-like means pivotally connected to said unit, and a single continuous member carried by the car and adapted to engage said link-like means and operative from the side of the car for projecting said unit into said coupling position.

THEODORE ROBERTSON WOERNLEY,
*Executor of the Last Will and Testament of Henry F. Woernley, Deceased.*